United States Patent [19]
Bem et al.

[11] Patent Number: 5,888,472
[45] Date of Patent: Mar. 30, 1999

[54] ZIRCONIUM SILICATE MOLECULAR SIEVES AND PROCESS USING THE SAME

[75] Inventors: David S. Bem, Arlington Heights; John D. Sherman, Inverness; Amedeo Napolitano, Des Plaines; E. Alejandro Leon-Escamilla, Arlington Heights; Gregory J. Lewis, Mount Prospect; Robert L. Bedard, Mc Henry, all of Ill.

[73] Assignee: UOP LLC, Des Plaines, Ill.

[21] Appl. No.: 833,638

[22] Filed: Apr. 8, 1997

[51] Int. Cl.$^6$ ............ C01B 39/06; C01B 39/46; C02F 1/42
[52] U.S. Cl. ............ 423/713; 423/718; 423/326; 423/331; 423/332; 210/681
[58] Field of Search .................. 423/700, 701, 423/713, 714, 715, 718, 71, 84, 85, 326, 331, 332; 210/681

[56] References Cited

U.S. PATENT DOCUMENTS

| | | | |
|---|---|---|---|
| 3,329,480 | 7/1967 | Young et al. | 423/715 |
| 4,344,851 | 8/1982 | Sherman et al. | 210/670 |
| 4,576,805 | 3/1986 | Chang et al. | 423/715 |
| 4,705,675 | 11/1987 | Desmond et al. | 423/713 |
| 5,015,453 | 5/1991 | Chapman | 423/713 |
| 5,208,006 | 5/1993 | Kuznicki et al. | 423/713 |
| 5,308,813 | 5/1994 | Vaughan et al. | 502/64 |
| 5,338,527 | 8/1994 | Lambert | 423/332 |
| 5,518,707 | 5/1996 | Bedard et al. | 423/700 |

OTHER PUBLICATIONS

Stud. Surf. Sci. Catal, 83 (Zeolites and Microporous Crystals), 57–66 (1994)(no month) Fricke, R., Kosslick, H., Tuan, V.A., Grohmann, I., Pilz, W., Storek, W., Walther,, G.
J. of Catalysis, 163, 501–505 (1996) (no month) Rakshe et al.
C.R. Acad. Sc. Paris, 278, 689 (1974)(no month) Baussy et al.
Contrib. Mineral. Petrol, 72, 191 (1980)(no month) Arima et al.
C.R. Acad. Sc. Paris, 270, 2741 (1970)(no month), Caruba et al.
Can. Mineral. 12, 143–144 (1974) (Jan.) Chao.
Can. Mineral., 12, 237 (1974) Jan. Chao et al.
Izvestiya Akademii Nauk SSSR, Neorganicheskie Materialy, 6, (11) 2081–2083 (1970 (Nov.) Alyamoyskaya et al.
Sov. Phys. Dopl., 15, No. 8 711(1971)(Feb.) Chernor et al.
Neorgancheskie Materialy, 29 (7) 971 (1993) Jul. Ilyushin.
Can. Mineral., 18, 497 (1980) (no month) Chao et al.
Powder Diffraction, 2 (3) 176 (1987)(Sep.) Wilson et al.,
J. Solid State Chem., 39, 219–229 (no month) (1981) Qui et al.
Solid State Ionics, 7, 345 1982 (no month) Alpal et al.
Russian J. of inorg. Chem. (Engl. Transl.) 9 (1), 177 (1964) (Jan.) Chukhlantsen et al.
PNNL–11451 report, "Efficient Separations and Processing. Crosscutting Program; Develop and Test Sorbents" G.N. Brown, Principal Investigator, Pacific Northwest Laboratory, 1996 Annual Progress Report, Jan. 1997.
"Proceedings of the Fifth International Conference on Zeolites" (1980) p. 823 (no month) Sherman et al.
"Syntheses and X–ray Powder Structures of $K_2)ZrSi_3O_9) \cdot H_2O$ and Its Ion–Exchanged Phases with Na and Cs", Damodara M. Poojary et al., *Inorganic Chem.* 36 (14), pp. 3072–3079 (1997) published on Jul. 2, 1997.

*Primary Examiner*—Mark L. Bell
*Assistant Examiner*—David Sample
*Attorney, Agent, or Firm*—Thomas K. McBride; Frank S. Molinaro

[57] ABSTRACT

A new family of crystalline molecular sieves have been synthesized. These compositions have a microporous structure of at least $ZrO_3$ octahedral units and $SiO_2$ tetrahedral units. Optionally, the molecular sieves contain M metals such as titanium or tin. These novel molecular sieves are prepared hydrothermally from a reaction mixture composed of reactive sources of the components. Additionally, these molecular sieves are useful for the selective adsorption of ammonium ions.

22 Claims, No Drawings

ZIRCONIUM SILICATE MOLECULAR SIEVES AND PROCESS USING THE SAME

FIELD OF THE INVENTION

This invention relates to a new family of crystalline molecular sieves. These molecular sieves have a microporous structure of at least $ZrO_3$ octahedral units and $SiO_2$ tetrahedral units. Optionally the molecular sieve can contain metals such as titanium or tin. This invention also relates to a method of preparing the molecular sieves and processes for using the molecular sieves.

BACKGROUND OF THE INVENTION

Zeolites are crystalline aluminosilicate molecular sieves which have a microporous three-dimensional framework structure. In general, the crystalline zeolites are formed from corner-sharing $AlO_2$ and $SiO_2$ tetrahedra and are characterized by having pore openings of uniform dimensions, having a significant, ion-exchange capacity and being capable of reversibly desorbing an adsorbed phase which is dispersed throughout the internal voids of the crystal without significantly displacing any atoms which make up the permanent crystal structure.

Other crystalline microporous compositions are known which are not zeolitic, i.e., do not contain $AlO_2$ tetraheda as essential framework constituents, but which exhibit the ion-exchange and/or adsorption characteristics of the zeolites. These include: 1) crystalline aluminophosphate compositions disclosed in U.S. Pat. No. 4,310,440; 2) silicon substituted aluminophosphates as disclosed in U.S. Pat. No. 4,440,871; 3) metal substituted aluminophosphates as disclosed in U.S. Pat. No. 4,853,197; 4) metal sulfide molecular sieves disclosed in U.S. Pat. No. 4,880,761 and 5) metallo zinc-phosphate compositions disclosed in U.S. Pat. No. 5,302,362. There are also various reports of zirconium silicate molecular sieves. U.S. Pat. No. 5,015,453 discloses zirconium, hafnium or titanium silicates containing both octahedral and tetrahedral framework units. In U.S. Pat. No. 4,705,675 it is disclosed that metals such as Sc, Ti, V, Cr, Mn, Fe, Co, Ni, Zn, Zr or Y can be inserted into the crystal structure of a zeolite. It is also stated that these metals are introduced as tetrahedral units. Zirconium silicates having the MFI and MEL structures have also been reported in *Stud. Surf. Sci. Catal*, 83 (Zeolites And Microporous Crystals), 57–66 (1994) and *J. of Catalvsis*, 163, 501–505 (1996). It is stated in these publications that zirconium is tetrahedral. A zirconium silicate identified as ZRSI-1 is disclosed in U.S. Pat. No. 5,338,527.

There are also numerous other reports of zirconium silicates including minerals and synthesized compositions. These include: 1) $Na_2ZrSi_3O_9.2H_2O$ (catapleiite), $Na_2ZrSi_6O_{15}.3H_2O$ (elpidite), $Na_3ZrSiO_6(O/OH)_{18}$ (lovozerite), $Na_2ZrSi_2O_7$ (parakeldyshite), $Na_2ZrSi_4O_{11}$ (vlasovite), $Na_2ZrSiO_5$, $Na_6Zr_2Si_4O_{15}$, $Na_4ZrSi_5O_{16}$, $Na_{14}Zr_2Si_{10}O_{31}$, disclosed in *C.R. Acad. Sc. Paris*, 278, 689 (1974); 2) $K_2ZrSi_3O_9$(wadeite) disclosed in *Contrib. Mineral. Petrol*, 72, 191 (1980); 3) $K_2ZrSi_6O_{15}$(dalyite) in *C.R. Acad. Sc. Paris*, 270, 2741 (1970); 4) $Na_2ZrSi_3O_9.2H_2O$ (gaidonnayite) in *Can. Mineral*, 12, 143–144 (1973); 5) $Na_2ZrSi_3O_9.3H_2O$ (hilairite) in *Can. Mineral.*, 12, 237 (1974); 6) $(Na/H)_2ZrSi_2O_7$(keldyshite) $Na_4Zr_2Si_5O_{16}$, *Izvestiva Akademii Nauk SSSR*, Neorganicheskie Materialy, 6, (11), 2081–2083 (1970); 7) $K_2ZrSi_2O_7$(khibinskite), Sov. Phys. Dopl., 15, 711 (1971); 8) $K_4Zr_2Si_6O_8.2H_2O$ (kostylevite), *Zup. Vses. Mineral*. O-Va., 112, 469 (1983); 9) $K_3Zr_2H(Si_3O_9)_2.2H_2O$ (paraumbite), $K_2ZrSi_3O_9.2H_2O$ (umbite), Neorganisheskie Materialy, 29 (7), 971 (1993); 10) $Na_5Zr_2Si_6O_{18}(CI/OH).2H_2O$ (petarasite), *Can. Mineral.*, 18, 497 (1980); 11) $LiNaZrSi_6O_{15}$(zektzerite), *Powder Diffraction*, 2 (3), 176 (1987); 12) $Na_4Zr_2Si_3O_{12}$ in *J. Solid State Chem.*, 39, 219–229 (1981); 13) $Na_4ZrSi_3O_{10}$ in *Solid State Ionics*, 7, 345 (1972); and 14) $K_2ZrSiO_5$ in *Inorg. Mater.* (Engl. Transl.) 9 (1), 117 (1964).

Finally, zirconium silicates are disclosed in PNNL-11451 report entitled, "Efficient Separations and Processing. Cross-cutting Program: Develop and Test Sorbents", G. N. Brown, Principal Investigator, Pacific Northwest Laboratory, 1996 Annual Progress Report.

In contrast to this art, applicants have developed a family of molecular sieves which have octahedral $ZrO_3$ units and tetrahedral $SiO_2$ units and an empirical formula on an anhydrous and as synthesized basis of:

$$A_pM_xZr_{1-x}Si_nO_m$$

where A is an exchangeable cation such as sodium or potassium ion, M is a framework metal such as tin or titanium, "p" has a value from about 1 to about 6, "x" has a value from greater than zero to less than 1, "n" has a value from about 2 to about 4, "m" has a value from about 7 to about 12. These compositions have an intracrystalline pore system allowing them to selectively exchange ions. In fact, applicants have determined that this family of molecular sieves can selectively exchange ammonium ions in the presence of calcium ions.

SUMMARY OF THE INVENTION

This invention relates to a novel family of molecular sieves, a process for preparing them, and processes using them. Accordingly, one embodiment of the invention is a crystalline zirconium silicate molecular sieve having a microporous framework structure containing at least $ZrO_3$ octahedral units and $SiO_2$ tetrahedral units and an empirical formula on an anhydrous and as synthesized basis of:

$$A_pM_xZr_{1-x}Si_nO_m$$

where A is an exchangeable cation selected from the group consisting of potassium ion, sodium ion or mixtures thereof, M is at least one framework metal selected from the group consisting of hafnium (4+), tin (4+), niobium(5+), titanium (4+), cerium (4+), praseodymium(4+), and terbium(4+), "p" has a value from about 1 to about 6, "X" has a value from greater than zero to less than 1, "n" has a value from about 2 to about 4, "m" has a value from about 7 to about 12, the molecular sieve characterized in that it has pores of less than 8 Å.

Another embodiment of the invention is a crystalline zirconium silicate molecular sieve having a microporous framework structure containing at least $ZrO_3$ octahedral units and $SiO_2$ tetrahedral units and an empirical formula on an anhydrous and as synthesized basis of:

$$A_pM_xZr_{1-x}Si_nO_m$$

where A is an exchangeable cation selected from the group consisting of potassium ion, sodium ion or mixtures thereof, M is at least one framework metal selected from the group consisting of hafnium (4+), tin (4+), niobium (5+), titanium (4+), cerium (4+), praseodymium (4+), and terbium (4+), "p" has a value from about 1 to about 6, "x" has a value from zero to less than 1, "n" has a value from about 2 to about 4, and "m" has a value from about 7 to about 12 and characterized in that it has an X-ray powder diffraction pattern which contains the d-spacings and intensities of Tables A to G.

Yet another embodiment of the invention is a process for preparing a crystalline zirconium silicate molecular sieve having a microporous framework structure containing at least $ZrO_3$ octahedral units and $SiO_2$ tetrahedral units and an empirical formula on an anhydrous and as synthesized basis of:

$$A_p M_x Zr_{1-x} Si_n O_m$$

where A is an exchangeable cation selected from the group consisting of potassium ion, sodium ion, or mixtures thereof, M is at least one framework metal selected from the group consisting of hafnium (4+), tin (4+), niobium (5+), titanium (4+), cerium (4+), praseodymium (4+), and terbium (4+), "p" has a value from about 1 to about 6, "x" has a value from zero to less than 1, "n" has a value from about 2 to about 4, and "m" has a value from about 7 to about 12, the process comprising forming a reaction mixture containing reactive sources of A, zirconium, silicon and optionally M at a temperature and a time sufficient to form the crystalline molecular sieve, the mixture having a composition expressed in terms of mole ratios of oxides of:

$$a\ A_2O:\ b\ MO_{q/2}:\ 1{-}b\ Zr\ O_2:\ c\ SiO_2:\ d\ H_2O$$

where "a" has a value from about 0.25 to about 40 "b" has a value from about 0 to about 1, "q" is the valence of M, "c" has a value from about 0.5 to about 30 and "d" has a value from about 10 to about 3000.

A further embodiment of the invention is a process for removing ammonium ions from an aqueous stream comprising contacting the stream with a molecular sieve for a time sufficient to exchange the ammonium ion onto the molecular sieve, the molecular sieve characterized in that it has a microporous framework structure containing at least $ZrO_3$ octahedral units and $SiO_2$ tetrahedral units and an empirical formula on an anhydrous and as synthesized basis of:

$$A_p M_x Zr_{1-x} Si_n O_m$$

where A is an exchangeable cation selected from the group consisting of potassium ion, sodium ion or mixtures thereof, M is at least one framework metal selected from the group consisting of hafnium (4+), tin (4+), niobium (5+), titanium (4+), cerium (4+), praseodymium (4+), and terbium (4+), "p" has a value from about 1 to about 6, "x" has a value from greater than zero to less than 1, "n" has a value from about 2 to about 4, "m" has a value from about 7 to about 12, the molecular sieve characterized in that it has pores of less than 8 Å.

These and other objects and embodiments will become more apparent in the following detailed description of the invention.

DETAILED DESCRIPTION OF THE INVENTION

As stated the present invention relates to a novel family of crystalline zirconium silicate molecular sieves. These molecular sieves have a microporous framework structure composed of at least $ZrO_3$ octahedral units and $SiO_2$ tetrahedral units. Further, these molecular sieves have the empirical formula:

$$A_p M_x Zr_{1-x} Si_n O_m$$

where A is an exchangeable cation selected from the group consisting of potassium ion, sodium ion or mixtures thereof, M is at least one framework metal selected from the group consisting of hafnium (4+), tin (4+), niobium (5+), titanium (4+), cerium (4+), praseodymium (4+), and terbium (4+), "p" has a value from about 1 to about 6, "x" has a value from zero to less than 1, "n" has a value from about 2 to about 4, and "m" has a value from about 7 to about 12. When "x" is zero, then the molecular sieve will have a characteristic diffraction pattern represented by one of the patterns set forth in Tables A to G. The M metals which can be inserted into the framework in place of zirconium will be present as $MO_3$ octahedral units and thus it is a requirement that they are capable of being octahedrally coordinated.

Applicants have developed a process for preparing these molecular sieves which process is a hydrothermal crystallization of a reaction mixture prepared by combining a reactive source of zirconium, silicon, optionally one or more M metal, at least one alkali metal and water. The alkali metal acts as a templating agent. Any zirconium compound which can be hydrolyzed to zirconium oxide or zirconium hydroxide can be used. Specific examples of these compounds include zirconium alkoxide, e.g., zirconium n-propoxide, zirconium hydroxide, zirconium oxychloride, zirconium chloride, zirconium phosphate and zirconium oxynitrate. The sources of silica include colloidal silica, fumed silica and sodium silicate. Alkali sources include potassium hydroxide, sodium hydroxide, sodium carbonate, potassium carbonate, sodium halide, potassium halide, sodium ethylenediamine tetracetic acid (EDTA) and potassium EDTA. The M metals sources include the M metal oxides, alkoxides, halide salts, acetate salts, nitrate salts and sulfate salts. Specific examples of the M metal sources include, but are not limited to titanium tetrachloride, titanium trichloride, titanium dioxide, tin tetrachloride, tin isopropoxide, niobium isopropoxide, hydrous niobium oxide, hafnium isopropoxide, hafnium chloride, hafnium oxychloride, cerium chloride, cerium oxide and cerium sulfate.

Generally, the hydrothermal process used to prepare the zirconium silicate molecular sieves of this invention involves forming a reaction mixture which in terms of molar ratios of the oxides is expressed by the formula:

$$a\ A_2O:\ b\ MO_{q/2}:\ 1{-}b\ Zr\ O_2:\ c\ SiO_2:\ d\ H_2O$$

where A is potassium or sodium, "a" has a value from about 0.25 to about 40, "b" has a value from about 0 to about 1, "q" is the valence of M, "c" has a value from about 0.5 to about 30 and "d" has a value from about 10 to about 3000. The reaction mixture is prepared by mixing the desired sources of zirconium, silicon, alkali metal and optional M metal in any order to give the desired mixture. It is also necessary that the mixture have a basic pH and preferably a pH of at least 8. The basicity of the mixture is controlled by adding excess alkali hydroxide and/or basic compounds of the other constituents of the mixture. Having formed the reaction mixture it is next reacted at a temperature of about 100° C. to about 250° C. for a period of about 1 to about 30 days in a sealed reaction vessel under autogenous pressure. After the allotted time, the mixture is filtered to isolate the solid product which is washed with deionized water and dried in air.

As stated the crystalline molecular sieves of this invention have a framework structure of octahedral $ZrO_3$ units, tetrahedral $SiO_2$ units and optionally octahedral $MO_3$ units. This framework results in a microporous structure having an intracrystalline pore system with uniform pore diameters, i.e., the pore sizes are crystallographically regular. The diameter of the pores can vary considerably from about 3 Å and larger. In some of the compositions the pores will be less than 8 Å.

As synthesized, the molecular sieves of this invention will contain some of the alkali metal templating agent in the pores. These metals are described as exchangeable cations meaning that they can be exchanged for other(secondary) cations. Generally, the A exchangeable cations can be exchanged for other alkali metal cations (K+, Na+, Rb+, Cs+), alkaline earth cations ($Mg^{2+}$, $Ca^{2+}$, $Sr^{2+}$, $Ba^{2+}$), hydronium ion, ammonium ion or mixtures thereof. The methods used to exchange one cation for another are well known in the art and involve contacting the molecular sieve with a solution containing the desired cation at exchange conditions. Exchange conditions include a temperature of about 25° C. to about 100° C. and a time of about 20 minutes to about 2 hours.

The crystalline microporous compositions of the present invention either as synthesized or after calcination can be used as catalysts or catalyst supports in a hydrocarbon conversion process. By hydrocarbon conversion process is meant a process which has hydrogen as one of its components. Generally these processes are hydrogenation, dehydrogenation, dehydration, hydrotreating, and syngas conversion reactions. Illustrative of these reactions are hydrocracking, hydrodenitrogenation, hydrodesulfurization, hydrogenation of aromatic and aliphatic unsaturated hydrocarbons, dehydrogenation of saturated and unsaturated aromatic and aliphatic hydrocarbons, methanation and syngas shift process. Specific reaction conditions regarding these processes are set forth in U.S. Pat. No. 4,310,440 which is incorporated herein by reference The molecular sieves of this invention are also capable of selective ion exchange of ammonium ions in various aqueous streams. It is well known that ammonia or ammonium cation is a serious pollutant in water. See U.S. Pat. No. 4,344,851 and "Proceedings of the Fifth International Conference on Zeolites", L. V. C. Rees, editor, Heyden Press, pp. 823–831 (1980). The ammonium ion can be removed from the aqueous stream by contacting the stream with the molecular sieve for a time sufficient to exchange the ammonium ions and trap them on the molecular sieve. The contacting can be carried out either in a batch mode or in a continuous mode. In a batch mode, the desired molecular sieve is placed in an appropriate container and the stream to be treated mixed therewith. Contacting is carried out for a time of about 0.1 to about 100 hr. In a continuous mode, the molecular sieve is placed in a column and the stream to be treated is flowed through it, usually downflow, until the ammonium ion is detected in the effluent of the column. The ammonium ion containing molecular sieve can either be disposed of or it can be regenerated by well known means.

To allow for ready reference, the different structure types of the zirconium silicate molecular sieves have been given arbitrary designations of UZSi-1 where the "1" represents a framework of structure type "1". That is, one or more zirconium silicate molecular sieves with different empirical formulas can have the same structure type.

The X-ray patterns presented in the following examples were obtained using standard X-ray powder diffraction techniques. The radiation source was a high-intensity X-ray tube operated at 45 Kv and 35 ma. The diffraction pattern from the copper K-alpha radiation was obtained by appropriate computer based techniques. Flat compressed powder samples were continuously scanned at 2° (2θ) per minute from 2° to 70°(2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ This uncertainty is, of course, also manifested in the reported values of the d-spacings, which are calculated from the θ values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m and w which represent very strong, strong, medium, and weak, respectively. In terms of 100 X $I/I_o$, the above designations are defined as w=0–15; m=15–60; s=60–80 and vs=80–100.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

The crystalline compositions of the instant invention may be characterized by their X-ray powder diffraction patterns and such may have one of the X-ray patterns containing the d-spacings and intensities set forth in the following Tables A through G. The intensities are the relative intensities as stated above.

TABLE A

| UZSi-1 | |
|---|---|
| d(Å) | I |
| 7.7–8.6 | m |
| 6.3–7.0 | m |
| 5.5–6.3 | s |
| 4.7–5.5 | m |
| 3.2–4.0 | m |
| 2.6–3.4 | vs |

TABLE B

| UZSi-2 | |
|---|---|
| d(Å) | I |
| 5.8–6.6 | m |
| 4.2–5.0 | w |
| 3.9–4.6 | m |
| 2.9–3.7 | m |
| 2.5–3.3 | vs |
| 2.3–3.0 | s |

TABLE C

| UZSi-6 | |
|---|---|
| d(Å) | I |
| 6.1–6.9 | m |
| 4.4–5.1 | m |
| 3.4–4.2 | m |
| 3.3–4.1 | m |

TABLE C-continued

UZSi-6

| d(Å) | I |
|---|---|
| 2.3–3.1 | vs |
| 2.2–3.0 | w |

TABLE D

UZSi-7

| d(Å) | I |
|---|---|
| 6.8–7.6 | vs |
| 5.6–6.4 | m |
| 3.7–4.5 | m |
| 3.6–4.4 | m |
| 2.6–3.4 | s-vs |
| 2.5–3.3 | m |
| 2.4–3.2 | vs |

TABLE E

UZSi-8

| d(Å) | I |
|---|---|
| 12.0–13.2 | vs |
| 3.9–4.7 | m |
| 2.8–3.6 | m |
| 2.3–3.1 | m |
| 2.2–3.0 | w |
| 2.1–2.9 | w |

TABLE F

UZSi-9

| d(Å) | I |
|---|---|
| 6.9–7.7 | w |
| 5.9–6.7 | m |
| 5.3–6.1 | s |
| 2.7–3.5 | vs |
| 2.0–2.8 | w |
| 1.6–2.4 | m |
| 1.5–2.3 | m |

TABLE G

UZSi-11

| d(Å) | I |
|---|---|
| 6.0–6.8 | w-m |
| 5.5–6.3 | m |
| 5.4–6.2 | vs |
| 5.2–6.0 | m |
| 2.7–3.5 | s |
| 2.5–3.3 | m |

In order to more fully illustrate the variety of species to be derived from 10 the instant invention, the following examples are set forth. It is to be understood that the examples are only by way of illustration and are not intended as an undue limitation on the broad scope of the invention as set forth in the appended claims.

EXAMPLE 1

UZSi-1

A solution was prepared by mixing 18.02 g of colloidal silica (DuPont Corp. identified as Ludox® AS-40) and 12.89 g $ZrOCl_2 \cdot 8H_2O$ (Aldrich 98%) in 100.0 g of deionized water. To this solution 56.26 g of 50 wt. % KOH solution was slowly added over a period of 20 minutes. The resulting gel was transferred to a stainless steel blender, homogenized for four minutes, divided into two portions which were transferred to Teflon® lined Parr reactors and hydrothermally reacted for 1 and 7 days at 200° C. The reactors were cooled to room temperature and the mixtures were vacuum filtered to isolate solids which were washed with deionized water and dried in air.

The solid reaction product reacted at 200° C. for 1 day, was analyzed and found to contain 21.39 wt % Si, 23.63 wt % Zr, K 19.67 wt % K LOI 6.48 wt %, which give a formula $K_{1.92}ZrSi_{2.94}O_{8.84} \cdot 1.5H_2O$. The X-ray powder diffraction pattern of this product, which contained no crystalline impurities, was characterized by the data presented in Table 1. The product of the reaction at 7 days had a substantially similar X-ray diffraction pattern to Table 1.

TABLE 1

| 2θ | d(Å) | I |
|---|---|---|
| 10.85 | 8.15 | m |
| 13.28 | 6.66 | m |
| 15.02 | 5.89 | s |
| 16.44 | 5.39 | w |
| 17.21 | 5.15 | w |
| 18.14 | 4.89 | w |
| 20.10 | 4.41 | m |
| 21.77 | 4.08 | w |
| 24.77 | 3.59 | w |
| 25.10 | 3.55 | m |
| 26.81 | 3.32 | m |
| 28.16 | 3.17 | w |
| 28.80 | 3.10 | w |
| 29.25 | 3.05 | w |
| 29.54 | 3.02 | vs |
| 30.32 | 2.95 | m |
| 30.81 | 2.90 | m |
| 31.05 | 2.88 | m |
| 31.98 | 2.80 | m |
| 33.21 | 2.70 | w |
| 34.38 | 2.61 | w |
| 34.76 | 2.58 | w |
| 35.31 | 2.54 | w |
| 36.83 | 2.44 | w |
| 37.82 | 2.38 | w |
| 38.57 | 2.33 | w |
| 40.10 | 2.25 | w |
| 41.57 | 2.17 | m |
| 43.77 | 2.07 | w |
| 46.25 | 1.96 | w |
| 46.70 | 1.94 | w |
| 48.05 | 1.89 | w |

EXAMPLE 2

Ti-UZSi-2

A solution was prepared by adding 12.03 g KOH to 8.60 g of Ludox® LS40. To this slurry there were added 0.57 g $TiO_2$ and 6.90 g $ZrOCl_2 \cdot 8H_2O$ and stirred. This slurry was mixed for 5 minutes then transferred to a Teflon® lined Parr reactor and heated at 200° C. for 7 days. After heating was completed, the reactor was cooled to room temperature and the mixture was vacuum filtered to isolate the solid which was washed with deionized water and dried in air.

The crystalline solid (Ti-UZSi-2) exhibited the powder diffraction pattern of Ti-UZSi-2 as the major phase (>90%) which was characterized by the data in Table 2. Scanning Electron Microscopy (SEM) of a portion of the sample, including EDAX of a crystal indicated the presence of titanium, zirconium, and silicon framework elements.

TABLE 2

| 2θ | d(Å) | I |
| --- | --- | --- |
| 14.22 | 6.22 | m |
| 19.10 | 4.64 | w |
| 20.82 | 4.26 | m |
| 26.65 | 3.34 | m |
| 30.33 | 2.94 | vs |
| 32.33 | 2.77 | s |
| 42.37 | 2.13 | m |
| 44.90 | 2.02 | w |

EXAMPLE 3

UZSi6

A reaction mixture of 11.92 g $ZrOCl_2 \cdot 8H_2O$ and 50 g of deionized water was added drop-wise to a stirring solution of 91.0 g NaOH, 11.45 g fumed silica (Cabot M-5 Cabosil®) and 291.0 g deionized $H_2O$. The resulting slurry was homogenized in a blender for 3 minutes, divided into several portions, transferred to Teflone lined Parr reactors and reacted at 150° C. for 7 days, 200° C. for 7 days and 225° C. for 1 and 7 days. Next the mixtures were vacuum filtered, and the solids were washed with deionized water and dried in air. Chemical analysis of the product obtained from 7days at 225° C. indicated the presence of 14.2 wt % Na, 29.8 wt % Zr, 18.8 wt % Si and 10.7 wt % LOI, giving a product of the composition: $Na_{1.88}ZrSi_{2.04}O_7 \cdot 2.02\ H_2O$. The X-ray powder diffraction pattern of the product showed the major phase (>80%) to be the crystalline sodium zirconium silicate UZSi-6 with a minor impurity phase. The characteristic X-ray diffraction data of the UZSi6 product are presented in Table 3. The products from the other reaction conditions showed X-ray diffraction patterns substantially the same as the one in Table 3.

TABLE 3

| 2θ | d(Å) | I |
| --- | --- | --- |
| 13.55 | 6.53 | m |
| 18.77 | 4.72 | m |
| 19.89 | 4.46 | w |
| 20.12 | 4.41 | w |
| 22.72 | 3.91 | w |
| 23.32 | 3.81 | m |
| 23.68 | 3.75 | m |
| 27.89 | 3.20 | w |
| 32.64 | 2.74 | m |
| 32.92 | 2.72 | vs |
| 33.32 | 2.69 | w |
| 33.96 | 2.64 | w |
| 40.80 | 2.21 | w |
| 47.64 | 1.91 | w |
| 48.48 | 1.88 | w |
| 53.60 | 1.71 | w |
| 56.24 | 1.63 | w |
| 58.56 | 1.58 | w |

EXAMPLE 4

UZSi-7

Fumed silica (5.05 g of Cabot M-5 Cabosil®) was slowly added to a stirring solution of 43.33 g $Na_2CO_3$ and 104 g of deionized $H_2O$. When the addition was complete, a solution of 12.89 g $ZrOCl_2 \cdot 8H_2O$ dissolved in 20 g of deionized $H_2O$ was added to the stirring $SiO_2/Na_2CO_3$ solution over approximately a 25 minute period. The resulting white gel was homogenized in a blender for 4 minutes, divided into two portions, transferred to Teflon® lined Parr reactors and reacted at 200° C. and 225° C. for 7 days. At the end of the reaction time, the mixtures were vacuum filtered, and the solids were washed with deionized water and dried in air. The X-ray powder diffraction pattern of the product from the reaction at 200° C. for 7 days showed the major product (>90%) to be a crystalline sodium zirconium silicate product UZSi-7. The characteristic X-ray data of UZSi-7 are presented in Table 4. Scanning Electron Microscopy (SEM) of a portion of the sample, including EDAX of a crystal indicated the presence of zirconium, and silicon framework elements. The product from the 225° C. for 7 day reaction was found to have substantially the same X-ray diffraction pattern as in Table 4.

TABLE 4

| 2-θ | d(Å) | I |
| --- | --- | --- |
| 12.35 | 7.16 | vs |
| 13.61 | 6.50 | w |
| 14.75 | 6.00 | m |
| 15.38 | 5.76 | w |
| 17.97 | 4.93 | w |
| 18.66 | 4.75 | w |
| 21.59 | 4.11 | m |
| 22.07 | 4.02 | m |
| 23.34 | 3.81 | w |
| 23.63 | 3.76 | m |
| 25.76 | 3.46 | w |
| 27.68 | 3.22 | w |
| 27.92 | 3.19 | m |
| 28.25 | 3.16 | m |
| 29.63 | 3.01 | vs |
| 30.38 | 2.94 | m |
| 31.07 | 2.88 | vs |
| 31.43 | 2.84 | m |
| 32.60 | 2.74 | w |
| 32.99 | 2.71 | m |
| 33.41 | 2.68 | w |
| 36.35 | 2.47 | m |
| 38.15 | 2.36 | w |
| 41.69 | 2.16 | m |
| 42.20 | 2.14 | w |
| 43.85 | 2.06 | w |
| 45.11 | 2.01 | w |
| 47.12 | 1.93 | w |
| 49.67 | 1.83 | w |
| 50.66 | 1.80 | m |

EXAMPLE 5

UZSi-

A solution of 10.00 g $ZrOCl_2 \cdot 8H_2O$ dissolved in 108.51 g deionized $H_2O$ was added to a solution of 39.2 g fumed silica (Cabot M-5 Cabosil), 408.43 g 40 wt % TPAOH (Sachem 40 wt %) and 42.32 g NaOH (Aldrich). The resulting white gel was homogenized in a blender for 4 minutes, transferred to a polyethylene bottle and aged at room temperature for 14 days. After aging, the mixture was re-homogenized in a blender for 3 minutes then transferred to a Teflon® lined Parr reactor and reacted for 7 days at 200° C. The mixture was vacuum filtered, and the solid was washed with deionized water and dried in air. The X-ray powder diffraction pattern of the product showed the majority product to be crystalline sodium zirconium silicate UZSi-8 (Table 5). A chemical analysis of the product indicated the presence of 14.7 wt % Na, 20.2 wt % Zr, 25.2 wt % Si and 16.79 wt % LOI, giving a product of the composition: $Na_{2.89}ZrSi_{4.06}O_{11.56} \cdot 5.11H_2O$.

TABLE 5

| 2-θ | d(Å) | I |
|---|---|---|
| 6.80 | 12.98 | vs |
| 15.78 | 5.61 | w |
| 20.48 | 4.33 | m |
| 24.98 | 3.56 | w |
| 27.35 | 3.26 | m |
| 31.34 | 2.85 | w |
| 31.85 | 2.81 | w |
| 32.27 | 2.77 | m |
| 33.89 | 2.64 | w |
| 34.37 | 2.61 | w |

EXAMPLE 6

UZSi-9

Cabosil® (5.68 g) was added to a stirring mixture of 43.98 g $Na_2CO_3$ dissolved in 100 g of de-ionized $H_2O$. When the addition was complete a solution of 9.67 g $ZrOCl_2 \cdot 8H_2O$ dissolved in 20 g of de-ionized $H_2O$ was added to the stirring $SiO_2/Na_2CO_3$ solution with a dropping funnel over approximately a 10 minute period. The resulting white gel was homogenized in a blender for 3 minutes, divided into several portions, transferred to Teflon® lined Parr reactors and reacted at 200° C. for 3, 7 and 10 days. At the end of the reaction time, the mixtures were vacuum filtered, and the solids were washed with deionized water and dried in air. The X-ray powder diffraction pattern of the sample heated at 200° C. for 3 days showed the product to be UZSi-9 without any crystalline impurities. The characteristic X-ray data of UZSi-9 are presented in Table 6. Scanning Electron Microscopy (SEM) of a portion of the sample, including EDAX of a crystal indicated the presence of zirconium, and silicon framework elements. Chemical analysis of this product indicated the presence of 13.50 wt. % Na, 22.7 wt. % Si, 24.5 wt. % Zr with an LOI of 11.6 wt. %, giving a product of the composition $Na_{2.19}ZrSi_{3.01}O_{9.11} \cdot 2.71 H_2O$. The products obtained from the other reaction conditions were found to have substantially the same X-ray diffraction pattern as that of Table 6.

TABLE 6

| 2-θ | d(Å) | I |
|---|---|---|
| 12.12 | 7.30 | w |
| 13.98 | 6.33 | m |
| 15.65 | 5.66 | s |
| 19.79 | 4.48 | w |
| 23.27 | 3.82 | w |
| 24.31 | 3.66 | w |
| 26.30 | 3.39 | m |
| 29.00 | 3.08 | vs |
| 31.52 | 2.84 | w |
| 32.30 | 2.77 | m |
| 34.58 | 2.59 | w |
| 36.05 | 2.49 | w |
| 36.74 | 2.44 | w |
| 43.29 | 2.09 | m |
| 45.71 | 1.98 | m |
| 46.31 | 1.96 | m |
| 48.56 | 1.87 | w |

EXAMPLE 7

UZSi-11

Fumed silica (25.3 g of Cabot M-5 Cabosil®) was added to a stirring solution of 189.02 g TMAOH, 27.29 g NaOH (Aldrich) and 57.29 g of deionized $H_2O$. When the addition was complete, a solution of 12.89 g $ZrOCl_2 \cdot 8H_2O$ (Aldrich 98%) dissolved in 70.0 g of de-ionized $H_2O$ was added to the stirring $SiO_2$/Na-TMAOH solution. The resulting white gel was homogenized in a blender for 3 minutes, transferred to a polyethylene bottle and aged at room temperature for 24 hrs., then re-homogenized for 4 minutes in a blender. The resulting slurry was reacted with tumbled agitation in a Teflon® lined Parr reactor at 200° C. for 7 days. After this time, the mixture was vacuum filtered, and the solid was washed with deionized water and dried in air. The X-ray powder diffraction pattern of the solid showed the product to be UZSi-11 without any crystalline impurities. The characteristic X-ray data of UZSi-11 are presented in Table 6. Scanning Electron Microscopy (SEM) of a portion of the sample, including EDAX of a crystal indicated the presence of zirconium, and silicon framework elements.

TABLE 7

| 2-θ | d(Å) | I |
|---|---|---|
| 13.76 | 6.43 | m |
| 14.90 | 5.94 | m |
| 15.12 | 5.86 | vs |
| 15.71 | 5.64 | m |
| 16.72 | 5.30 | w |
| 20.57 | 4.31 | m |
| 24.48 | 3.63 | w |
| 24.65 | 3.61 | w |
| 25.83 | 3.45 | m |
| 26.42 | 3.37 | w |
| 26.72 | 3.33 | w |
| 28.56 | 3.12 | s |
| 28.82 | 3.09 | m |
| 30.53 | 2.93 | m |
| 31.53 | 2.83 | m |
| 31.82 | 2.81 | m |
| 33.83 | 2.65 | w |
| 34.55 | 2.59 | w |
| 36.02 | 2.49 | w |
| 36.20 | 2.48 | w |
| 37.38 | 2.40 | w |
| 41.01 | 2.20 | m |
| 42.95 | 2.10 | w |
| 44.43 | 2.04 | w |
| 46.54 | 1.95 | w |
| 48.08 | 1.89 | w |

EXAMPLE 8

A sample of UZSi-1 from Example 1 was tested for its ability to remove ammonium ions in the presence of mono and divalent metal cations. A sample of zeolite W (obtained from UOP) was tested for comparison. In a container 20.16 g of the potassium form of zeolite W or 19.00 g of UZSi-1 were contacted with 500 ml of an aqueous solution having a pH of 8.0 and containing the ions in Table 8.

TABLE 8

| Concentration of Ions in Test Solution | | | | | |
|---|---|---|---|---|---|
| Ion | $NH_4^+$ | $Na^+$ | $K^+$ | $Ca^{+2}$ | $Mg^{+2}$ |
| Concentration (mg/L) | 880 | 2640 | 660 | 2640 | 440 |

This test solution simulates a secondary wastewater treatment effluent. The mixture of molecular sieve and aqueous solution was shaken on a wrist-action shaker for 16 hours at which point the solution was replaced with fresh solution and shaking resumed. This procedure was carried out for a total of 10 times to ensure equilibrium was reached. After the test was completed, the solid was isolated and analyzed for ammonium ion concentration by ion chromatography and for $Na^+$, $K^+$, $Ca^{+2}$ and $Mg^{+2}$ concentration by Atomic Absorption spectroscopy.

Table 9 presents the ammonium, calcium and magnesium capacity and selectivity in units of millequivalents of cation per gram of molecular sieve.

TABLE 9

Cation Capacity and Ammonium Selectivity for Zeolite W and UZSi-1

| Parameter | Zeolite W | UZSi-1 |
|---|---|---|
| $NH_4^+$ capacity | 1.93 | 1.94 |
| $Ca^{+2}$ capacity | 1.12 | 0.10 |
| $Mg^{+2}$ capacity | 0.19 | 0.14 |
| $NH_4^+$ selectivity* | 1.5 | 16.5 |

*$NH_4^+$ selectivity = ($NH_4^+$ capacity)/($CA^{+2}$ + $Mg^{+2}$ capacity)

We claim as our invention:

1. A crystalline zirconium silicate molecular sieve having a microporous framework structure containing at least $ZrO_3$ octahedral units and $SiO_2$ tetrahedral units and an empirical formula on an anhydrous and as synthesized basis of:

$$A_pM_xZr_{1-x}Si_nO_m$$

where A is an exchangeable cation selected from the group consisting of potassium ion, sodium ion or mixtures thereof, M is at least one framework metal selected from the group consisting of hafnium (4+), tin (4+), niobium(5+), titanium (4+), cerium (4+), praseodymium (4+), and terbium(4+), "p" has a value from about 1 to about 6, "x" has a value from greater than zero to less than 1, "n" has a value from about 2 to about 4, "m" has a value from about 7 to about 12, the molecular sieve characterized in that it has pores of less than 7.5 Å.

2. The molecular sieve of claim 1 characterized in that it has a X-ray powder diffraction pattern which contains at least the d-spacings and intensities of Tables A to G.

3. The molecular sieve of claim 1 further characterized in that the A cation has been exchanged for a secondary cation selected from the group consisting of alkali metal ions, alkaline earth metal ions, hydronium ion, ammonium ion and mixtures thereof.

4. The molecular sieve of claim 1 where M is tin (4+).

5. The molecular sieve of claim 1 where M is titanium (4+).

6. A crystalline zirconium silicate molecular sieve having a microporous framework structure containing at least $ZrO_3$ octahedral units and SiO2 tetrahedral units and an empirical formula on an anhydrous and as synthesized basis of:

$$A_pM_xZr_{1-x}Si_nO_m$$

where A is an exchangeable cation selected from the group consisting of potassium ion, sodium ion, or mixtures thereof, M is at least one framework metal selected from the group consisting of hafnium (4+), tin (4+), niobium(5+), titanium (4+), cerium (4+), praseodymium (4+), and terbium(4+), "p" has a value from about 1 to about 6, "x" has a value from zero to less than 1, "n" has a value from about 2 to about 4, and "m" has a value from about 7 to about 12, and characterized in that it has a X-ray powder diffraction pattern which contains the d-spacings and intensities of Tables A to G.

7. The molecular sieve of claim 6 further characterized in that the A cation has been exchanged for a secondary cation selected from the group consisting of alkali metal ions, alkaline earth metal ions, hydronium ion, ammonium ion and mixtures thereof.

8. The molecular sieve of claim 6 where M is tin (4+).

9. The molecular sieve of claim 6 where M is titanium (4+).

10. A process for preparing a crystalline zirconium silicate molecular sieve having a microporous framework structure containing at least $ZrO_3$ octahedral units and $SiO_2$ tetrahedral units and an empirical formula on an anhydrous and as synthesized basis of:

$$A_pM_xZr_{1-x}Si_nO_m$$

where A is an exchangeable cation selected from the group consisting of potassium ion, sodium ion, or mixtures thereof, M is at least one framework metal selected from the group consisting of hafnium (4+), tin (4+), niobium (5+), titanium (4+), cerium (4+), praseodymium (4+), and terbium (4+), "p" has a value from about 1 to about 6, "x" has a value from zero to less than 1, n has a value from about 2 to about 4, and m has a value from about 7 to about 12, and characterized in that it has pores of less than 7.5 Å, the process comprising forming a reaction mixture containing reactive sources of A, zirconium, silicon, and optionally M at a temperature and a time sufficient to form the crystalline molecular sieve, the mixture having a composition expressed in terms of mole ratios of oxides of $$a\ A_2O:\ b\ Mo_{q/2}b\ Zr\ O_2:\ c\ SiO_2:d\ H_2O$$

where "a" has a value from about 0.25 to about 40, "b" has a value from about 0 to about 1, "q" is the valence of M, "c" has a value from about 0.5 to about 30, and "d" has a value from about 10 to about 3000.

11. The process of claim 10 further characterized in that the A cation is exchanged for a secondary cation selected from the group consisting of alkali metal ions, alkaline earth metal ions, hydronium ion, ammonium ion and mixtures thereof by contacting the molecular sieve with a solution containing at least one of said secondary cation at exchange conditions thereby exchanging the A cation for the secondary cation.

12. The process of claim 10 where the temperature varies from about 100° C. to about 250° C. and the time varies from about 1 to about 30 days.

13. The process of claim 10 where the zirconium source is selected from the group consisting of zirconium alkoxide, zirconium hydroxide, zirconium oxychloride, zirconium chloride, zirconium phosphate and zirconium oxynitrate.

14. The process of claim 10 where the silicon source is selected from the group consisting of colloidal silica, fumed silica and sodium silicate.

15. The process of claim 10 where the alkali metal source is selected from the group consisting of halide, acetate, carbonate, EDTA and hydroxide salts of the alkali metals.

16. The process of claim 10 where the M source is selected from the group consisting of halide salts, acetate salts, nitrate salts, sulfate salts, oxides and alkoxides of the M metal.

17. A process for removing ammonium ions from an aqueous stream comprising contacting the stream with a molecular sieve for a time sufficient to exchange the ammonium ion for an exchangeable cation on the molecular sieve, the molecular sieve characterized in that it has a microporous framework structure containing at least $ZrO_3$ octahedral units and $SiO_2$ tetrahedral units and an empirical formula on an anhydrous and as synthesized basis of:

$$A_pM_xZr_{1-x}Si_nO_m$$

where A is an exchangeable cation selected from the group consisting of potassium ion, sodium ion or mixtures thereof, M is at least one framework metal selected from the group consisting of hafnium (4+), tin (4+), niobium (5+), titanium (4+), cerium (4+), praseodymium (4+), and terbium (4+), "p" has a value from about 1 to about 6, "x" has a value from greater than zero to less than 1, "n" has a value from about 2 to about 4, "m" has a value from about 7 to about 12, the molecular sieve characterized in that it has pores of less than 7.5 Å.

18. The process of claim 17 where the process is a batch process.

19. The process of claim 17 where the process is a continuous process.

20. A process for removing ammonium ions from an aqueous stream comprising contacting the stream with a molecular sieve for a time sufficient to exchange the ammonium ion for an exchangeable cation on the molecular sieve, the molecular sieve characterized in that it has a microporous framework structure containing at least $ZrO_3$ octahedral units and $SiO_2$ tetrahedral units and an empirical formula on an anhydrous and as synthesized basis of:

$$A_pM_xZr_{1-x}Si_nO_m$$

where A is an exchangeable cation selected from the group consisting of potassium ion, sodium ion or mixtures thereof, M is at least one framework metal selected from the group consisting of hafnium (4+), tin (4+), niobium (5+), titanium (4+), cerium (4+), praseodymium (4+), and terbium (4+), "p" has a value from about 1 to about 6, "x" has a value from zero to less than 1, "n" has a value from about 2 to about 4, "m" has a value from about 7 to about 12, and characterized in that it has a X-ray powder diffraction pattern which contains the d-spacings and intensities of Tables A to G.

21. The process of claim 20 where the process is a batch process.

22. The process of claim 20 where the process is a continuous process.

* * * * *

UNITED STATES PATENT AND TRADEMARK OFFICE
CERTIFICATE OF CORRECTION

PATENT NO. : 5,888,472
DATED : 3/30/99
INVENTOR(S) : BEM,. et al.

It is certified that error appears in the above-identified patent and that said Letters Patent is hereby corrected as shown below:

In claim 6, line 51, the elemental structure after "octrahedral units and..." should read—$SiO_2$—instead of SiO2.

Signed and Sealed this

Eighteenth Day of April, 2000

*Attest:*

Q. TODD DICKINSON

*Attesting Officer*  *Director of Patents and Trademarks*